E. G. STAUDE.
GEARING.
APPLICATION FILED OCT. 26, 1916.

1,324,473.

Patented Dec. 9, 1919.

WITNESSES
M. R. McInnis
G. E. Sorensen

INVENTOR
EDWIN G. STAUDE
BY
Paul & Paul
ATTORNEYS

UNITED STATES PATENT OFFICE.

EDWIN G. STAUDE, OF MINNEAPOLIS, MINNESOTA.

GEARING.

1,324,473. Specification of Letters Patent. Patented Dec. 9, 1919.

Application filed October 26, 1916. Serial No. 127,790.

*To all whom it may concern:*

Be it known that I, EDWIN G. STAUDE, a citizen of the United States, resident of Minneapolis, county of Hennepin, State of Minnesota, have invented certain new and useful Improvements in Gearing, of which the following is a specification.

In the manufacture of tractors or similar machines where an internal gear is mounted on the rim or spokes of a bull wheel for transmitting power from the motor, great difficulty is experienced on account of the accumulation of soil between the teeth of the gear, and often becoming packed so hard by the pressure of the pinion teeth thereon that removal can only be accomplished by the use of a hammer or chisel.

The object of my invention is to provide a form of gear which will automatically clear itself of all accumulations of soil between the teeth, the gear being so constructed that this clearance is effected without in any way weakening the gear teeth.

The invention consists generally in various constructions and combinations, all as hereinafter described and particularly pointed out in the claims.

Figure 1:
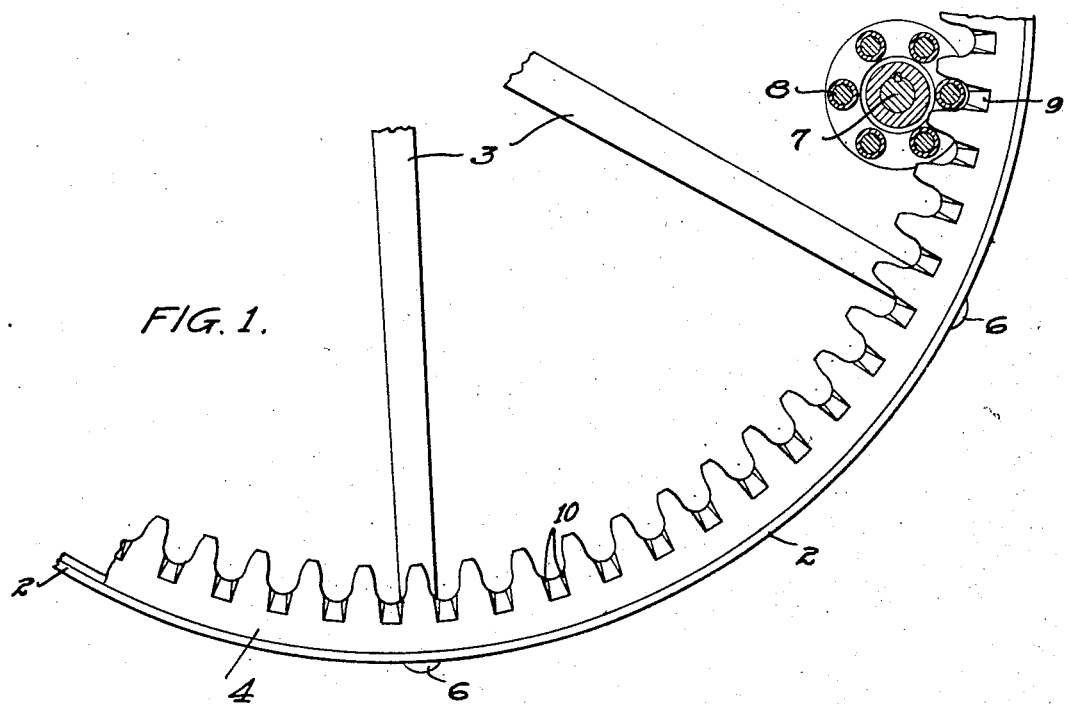
Figure 3:
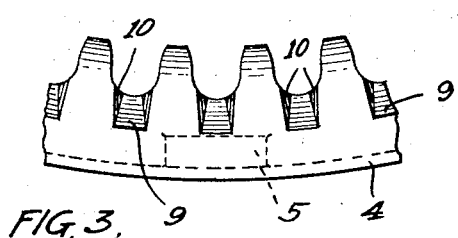
Figure 2:
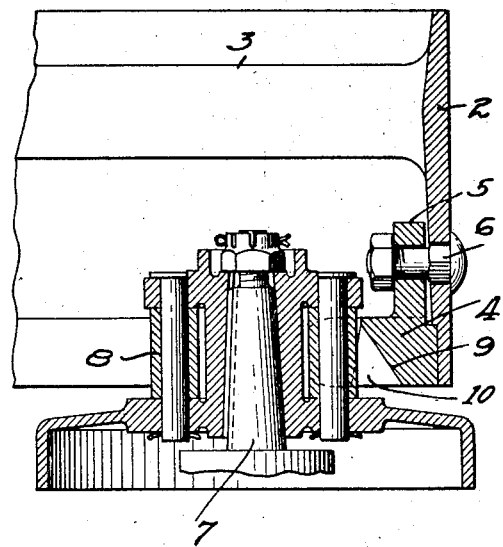
Figure 4:
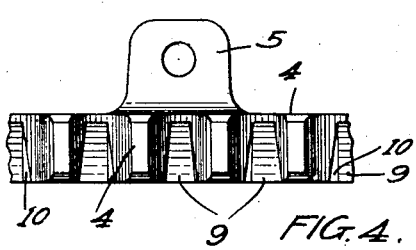
Figure 5:
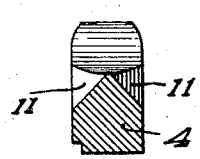

In the accompanying drawings forming part of this specification,

Figure 1 is a side view of a portion of a large traction wheel, commonly called a "bull" wheel, with my invention embodied in the gear teeth, Fig. 2 is a detail sectional view, showing the driving pinion in mesh with the teeth of the wheel, Fig. 3 is a side view of a portion of the gear ring, Fig. 4 is a plan view of the same, Fig. 5 is a detail view of a modified form of one of the traction wheel teeth.

In the drawing, 2 represents the rim of the traction wheel, 3 the spokes thereof, and 4 an internal gear ring having lugs 5 secured to the rim of the traction wheel by suitable means, such as bolts 6. 7 is a spindle and 8 is a pinion of the roller type, mounted thereon, though any ordinary toothed pinion may be used instead, if preferred, as my invention does not necessitate the employment of any particular type of driving pinion. This pinion is connected with a source of motive power (not shown) in any suitable way and as it forms no part of this present invention I have not thought it necessary to illustrate the driving means herein.

In making gear rings of the type to which this invention relates it is customary to mold the entire gear in the "drag" and because sufficient draft is not practicable the teeth are formed by "core work" where a double inclined bottom to the space between the teeth is formed. To enable the entire gear including the teeth to be cast or molded in the "drag" without "core work" for the teeth is one object of the present invention. Another object is to facilitate the discharge of dirt from between the teeth so that it will not become packed between the teeth and require manual operation for its removal. The first object is accomplished by having the bottom of the space between the teeth to incline in one direction only, from one side of the gear to the other. The other object is accomplished by having the faces of the teeth forming the walls of the recesses flare outwardly toward the face of the gear ring. Accordingly I form the bottom of each recess between each two teeth of the gear on a bevel 9 or inclined outwardly with respect to the axis of the wheel or the center of revolution of the gear, and I so form the side walls of the recess, as indicated at 10, that they will flare outwardly and form, with the floor, a recess which gradually increases in cross sectional area from the inner face of the gear toward the outer face thereof. The result is that when the soil enters this recess and is pressed down by the teeth of the pinion, it will be directed outwardly by the inclined walls and instead of packing down on the flat bottom of the recess, will be gradually worked out toward the outer face of the gear and discharged from between the teeth. This action will be entirely automatic, and the pressure of the pinion teeth will be continuous and the accumulation of soil in the recess only serving to hasten the discharge of the soil that has previously gathered therein. The result is that as fast as the recesses between the teeth fill with soil, it will be forced out by the pressure of the pinion.

In Fig. 5 I have shown a modified construction of the gear ring, which consists in providing a beveled surface 11 on each side of the center of the bottom of the recess, between each tooth, so that the soil accumulating therein will be directed both inwardly and outwardly by the action of the pinion teeth. In other respects the operation will be the same for the discharge of the accumulated soil between the teeth as previously described with reference to the other figures.

I claim as my invention:

1. The combination, with a traction wheel, of an internal gear ring secured to the rim thereof, said ring having surfaces between its teeth which flare outwardly from the inner face of said ring to the outer face thereof and intersect said inner face at an acute angle, whereby the pressure of the teeth of the gear meshing with said ring will force any accumulation of soil or foreign material outwardly from between the teeth of said ring.

2. The combination with a traction wheel, of an internal gear ring secured to the rim thereof, the bottom of the recesses between the teeth being downwardly inclined toward a side face of the ring and the walls of the recesses being flared toward the same face of the ring, the incline of the floor and flare of the side walls forming a recess of gradually increasing sectional area toward a side of the ring.

In witness whereof, I have hereunto set my hand this 23rd day of October 1916.

EDWIN G. STAUDE.